(12) United States Patent
Gass et al.

(10) Patent No.: US 6,826,988 B2
(45) Date of Patent: Dec. 7, 2004

(54) MITER SAW WITH IMPROVED SAFETY SYSTEM

(75) Inventors: Stephen F. Gass, Wilsonville, OR (US); J. David Fulmer, Tualatin, OR (US)

(73) Assignee: SD3, LLC, Wilsonville, OR (US)

( * ) Notice: Subject to any disclaimer, the term of this patent is extended or adjusted under 35 U.S.C. 154(b) by 326 days.

(21) Appl. No.: 10/052,274

(22) Filed: Jan. 16, 2002

(65) Prior Publication Data

US 2002/0059854 A1 May 23, 2002

Related U.S. Application Data

(63) Continuation-in-part of application No. 09/676,190, filed on Sep. 29, 2000, and a continuation-in-part of application No. 09/929,221, filed on Aug. 13, 2001, and a continuation-in-part of application No. 09/929,226, filed on Aug. 13, 2001, and a continuation-in-part of application No. 09/929,227, filed on Aug. 13, 2001, and a continuation-in-part of application No. 09/929,234, filed on Aug. 13, 2001, and a continuation-in-part of application No. 09/929,235, filed on Aug. 13, 2001, and a continuation-in-part of application No. 09/929,236, filed on Aug. 13, 2001, and a continuation-in-part of application No. 09/929,237, filed on Aug. 13, 2001, and a continuation-in-part of application No. 09/929,238, filed on Aug. 13, 2001, and a continuation-in-part of application No. 09/929,240, filed on Aug. 13, 2001, and a continuation-in-part of application No. 09/929,241, filed on Aug. 13, 2001, and a continuation-in-part of application No. 09/929,242, filed on Aug. 13, 2001, and a continuation-in-part of application No. 09/929,244, filed on Aug. 13, 2001, and a continuation-in-part of application No. 09/929,425, filed on Aug. 13, 2001, and a continuation-in-part of application No. 09/929,426, filed on Aug. 13, 2001.

(60) Provisional application No. 60/270,011, filed on Feb. 20, 2001, provisional application No. 60/270,941, filed on Feb. 22, 2001, provisional application No. 60/279,942, filed on Feb. 22, 2001, provisional application No. 60/273,177, filed on Mar. 2, 2001, and provisional application No. 60/273,178, filed on Mar. 2, 2001.

(51) Int. Cl.[7] .............................. B26D 5/00; B26D 1/14; B27B 5/18

(52) U.S. Cl. .................. 83/62.1; 83/58; 83/DIG. 1; 83/471.3; 83/477.1; 83/490; 83/589; 83/581; 192/129 R; 192/138; 307/326

(58) Field of Search ............................... 83/397, 397.1, 83/471.2, 471.3, 475, 477, 477.1, 456, 472.2, DIG. 1, 569, 561, 581, 491, 58, 62.1; 56/10.4, 11.3; 144/182.5, 356, 384, 391, 427, 286.5; 337/1, 5, 10, 17, 70, 189, 148, 170, 180, 237, 288; 411/7, 39, 350; 74/2, 814; 102/437, 464, 438, 377; 335/147, 1, 132; 155/87.7, 87.74, 87.77, 826, 376, 379; 307/142, 115, 117, 131, 326; 152/129 B, 133, 149, 194, 137, 138; 340/690, 563, 590; 361/623, 103, 1, 124, 105; 30/382, 381; 169/42; 318/362; 403/2

(56) References Cited

U.S. PATENT DOCUMENTS

| | | |
|---|---|---|
| 941,726 A | 11/1909 | Pfalzgraf |
| 1,205,246 A | 11/1916 | Mowry |
| 1,551,900 A | 9/1925 | Morrow |

(List continued on next page.)

FOREIGN PATENT DOCUMENTS

| | | |
|---|---|---|
| CH | 297525 | 6/1954 |
| DE | 76186 | 8/1921 |
| DE | 2800403 | 7/1979 |

(List continued on next page.)

OTHER PUBLICATIONS

Gordon Engineering Corp., Product Catalog, Oct. 1997, pp. cover, 1, 3, and back, Brookfield, Connecticut, US.

*Primary Examiner*—Boyer D. Ashley

(57) ABSTRACT

A woodworking machine is disclosed having a base, a blade, a detection system adapted to detect a dangerous condition between a person and the blade, and a reaction system associated with the detection system to cause a predetermined action to take place upon detection of the dangerous condition. The blade is rotatable, and moves into a cutting zone to cut a workpiece. The predetermined action may be to stop the blade from rotating and/or to stop movement of the blade toward the cutting zone.

8 Claims, 5 Drawing Sheets

U.S. PATENT DOCUMENTS

| | | |
|---|---|---|
| 1,807,120 A | 5/1931 | Lewis |
| 1,811,066 A | 6/1931 | Tannewitz |
| 1,896,924 A | 2/1933 | Ulrich |
| 1,902,270 A | 3/1933 | Tate |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 2,007,887 A | 7/1935 | Tautz |
| 2,020,222 A | 11/1935 | Tautz |
| 2,038,810 A | 4/1936 | Tautz |
| 2,106,288 A | 1/1938 | Tautz |
| 2,163,320 A | 6/1939 | Hammond |
| 2,241,556 A | 5/1941 | MacMillin et al. |
| 2,286,589 A | 6/1942 | Tannewitz |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,425,331 A | 8/1947 | Kramer |
| 2,434,174 A | 1/1948 | Morgan |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,572,326 A | 10/1951 | Evans |
| 2,593,596 A | 4/1952 | Olson |
| 2,623,555 A | 12/1952 | Eschenburg |
| 2,661,780 A | 12/1953 | Morgan |
| 2,675,707 A | 4/1954 | Brown |
| 2,690,084 A | 9/1954 | Van Dam |
| 2,722,246 A | 11/1955 | Arnoldy |
| 2,731,049 A | 1/1956 | Akin |
| 2,736,348 A | 2/1956 | Nelson |
| 2,785,710 A | 3/1957 | Mowery, Jr. |
| 2,786,496 A | 3/1957 | Eschenburg |
| 2,954,118 A | 9/1960 | Anderson |
| 2,978,084 A | 4/1961 | Vilkaitis |
| 2,984,268 A * | 5/1961 | Vuichard ................ 83/68 |
| 3,011,610 A | 12/1961 | Stiebel et al. |
| 3,047,116 A | 7/1962 | Stiebel et al. |
| 3,129,731 A | 4/1964 | Tyrrell |
| 3,163,732 A | 12/1964 | Abbott |
| 3,186,256 A | 6/1965 | Reznick |
| 3,207,273 A | 9/1965 | Jurin |
| 3,224,474 A | 12/1965 | Bloom |
| 3,323,814 A | 6/1967 | Phillips |
| 3,386,322 A | 6/1968 | Stone et al. |
| 3,454,286 A | 7/1969 | Anderson et al. |
| 3,540,338 A | 11/1970 | McEwan et al. |
| 3,554,067 A | 1/1971 | Scutella |
| 3,581,784 A | 6/1971 | Warrick |
| 3,613,748 A | 10/1971 | De Pue |
| 3,675,444 A | 7/1972 | Whipple |
| 3,680,609 A | 8/1972 | Menge |
| 3,695,116 A | 10/1972 | Baur |
| 3,745,546 A | 7/1973 | Struger et al. |
| 3,749,933 A | 7/1973 | Davidson |
| 3,772,590 A | 11/1973 | Mikulecky et al. |
| 3,785,230 A | 1/1974 | Lokey |
| 3,829,850 A | 8/1974 | Guetersloh |
| 3,858,095 A | 12/1974 | Friemann et al. |
| 3,861,016 A | 1/1975 | Johnson et al. |
| 3,922,785 A | 12/1975 | Fushiya |
| 3,924,688 A | 12/1975 | Cooper et al. |
| 3,931,727 A | 1/1976 | Luenser |
| 3,946,631 A | 3/1976 | Malm |
| 3,947,734 A | 3/1976 | Fyler |
| 3,953,770 A | 4/1976 | Hayashi |
| 3,967,161 A | 6/1976 | Lichtblau |
| 4,007,679 A | 2/1977 | Edwards |
| 4,026,177 A | 5/1977 | Lokey |
| 4,047,156 A | 9/1977 | Atkins |
| 4,060,160 A | 11/1977 | Lieber |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,117,752 A | 10/1978 | Yoneda |
| 4,145,940 A | 3/1979 | Woloveke et al. |
| 4,152,833 A | 5/1979 | Phillips |
| 4,161,649 A | 7/1979 | Klos et al. |
| 4,175,452 A | 11/1979 | Idel |
| 4,190,000 A | 2/1980 | Shaull et al. |
| 4,195,722 A | 4/1980 | Anderson et al. |
| 4,249,117 A | 2/1981 | Leukhardt et al. |
| 4,249,442 A | 2/1981 | Fittery |
| 4,267,914 A | 5/1981 | Saar |
| 4,270,427 A | 6/1981 | Colberg et al. |
| 4,276,799 A | 7/1981 | Muehling |
| 4,305,442 A | 12/1981 | Currie |
| 4,321,841 A | 3/1982 | Felix |
| 4,372,202 A | 2/1983 | Cameron |
| 4,391,358 A | 7/1983 | Haeger |
| 4,466,233 A | 8/1984 | Thesman |
| 4,470,046 A | 9/1984 | Betsill |
| 4,510,489 A | 4/1985 | Anderson, III et al. |
| 4,512,224 A * | 4/1985 | Terauchi .................... 82/48 |
| 4,518,043 A | 5/1985 | Anderson et al. |
| 4,532,501 A | 7/1985 | Hoffman |
| 4,532,844 A | 8/1985 | Chang et al. |
| 4,560,033 A | 12/1985 | DeWoody et al. |
| 4,566,512 A | 1/1986 | Wilson |
| 4,573,556 A | 3/1986 | Andreasson |
| 4,589,047 A | 5/1986 | Gaus et al. |
| 4,599,597 A | 7/1986 | Rotbart |
| 4,599,927 A | 7/1986 | Eccardt et al. |
| 4,606,251 A | 8/1986 | Boileau |
| 4,621,300 A | 11/1986 | Summerer |
| 4,637,289 A | 1/1987 | Ramsden |
| 4,722,021 A | 1/1988 | Hornung et al. |
| 4,751,603 A | 6/1988 | Kwan |
| 4,757,881 A | 7/1988 | Jonsson et al. |
| 4,792,965 A | 12/1988 | Morgan |
| 4,805,504 A | 2/1989 | Fushiya et al. |
| 4,840,135 A | 6/1989 | Yamauchi |
| 4,864,455 A | 9/1989 | Shimomura et al. |
| 4,906,962 A | 3/1990 | Duimstra |
| 4,965,909 A | 10/1990 | McCullough et al. |
| 5,025,175 A | 6/1991 | Dubois, III |
| 5,046,426 A | 9/1991 | Julien et al. |
| 5,052,255 A | 10/1991 | Gaines |
| 5,081,406 A | 1/1992 | Hughes et al. |
| 5,082,316 A | 1/1992 | Wardlaw |
| 5,086,890 A | 2/1992 | Turczyn et al. |
| 5,119,555 A | 6/1992 | Johnson |
| 5,122,091 A | 6/1992 | Townsend |
| 5,184,534 A | 2/1993 | Lee |
| 5,198,702 A | 3/1993 | McCullough et al. |
| 5,201,684 A | 4/1993 | DeBois, III |
| 5,207,253 A | 5/1993 | Hoshino et al. |
| 5,212,621 A | 5/1993 | Panter |
| 5,218,189 A | 6/1993 | Hutchison |
| 5,245,879 A | 9/1993 | McKeon |
| 5,257,570 A * | 11/1993 | Shiotani et al. ............ 83/471.3 |
| 5,265,510 A | 11/1993 | Hoyer-Ellefsen |
| 5,272,946 A | 12/1993 | McCullough et al. |
| 5,276,431 A | 1/1994 | Piccoli et al. |
| 5,285,708 A * | 2/1994 | Bosten et al. ................ 83/520 |

| | | | | | |
|---|---|---|---|---|---|
| 5,320,382 A | 6/1994 | Goldstein et al. | 6,607,015 B1 | 8/2003 | Chen |
| 5,321,230 A | 6/1994 | Shanklin et al. | D479,538 S | 9/2003 | Welsh et al. |
| 5,331,875 A | 7/1994 | Mayfield | 6,619,348 B2 | 9/2003 | Wang |
| 5,377,554 A | 1/1995 | Reulein et al. | 6,640,683 B2 | 11/2003 | Lee |
| 5,377,571 A | 1/1995 | Josephs | 6,644,157 B2 | 11/2003 | Huang |
| 5,392,678 A | 2/1995 | Sasaki et al. | 6,647,847 B2 | 11/2003 | Hewitt et al. |
| 5,471,888 A | 12/1995 | McCormick | 2002/0017175 A1 * | 2/2002 | Gass et al. ............ 83/13 |
| 5,510,685 A | 4/1996 | Grasselli | 2002/0017176 A1 | 2/2002 | Gass et al. |
| 5,534,836 A | 7/1996 | Schenkel et al. | 2002/0017178 A1 | 2/2002 | Gass et al. |
| 5,606,889 A | 3/1997 | Bielinski et al. | 2002/0017179 A1 * | 2/2002 | Gass et al. ............ 83/58 |
| 5,667,152 A | 9/1997 | Mooring | 2002/0017180 A1 | 2/2002 | Gass et al. |
| 5,671,633 A | 9/1997 | Wagner | 2002/0017181 A1 * | 2/2002 | Gass et al. ............ 83/58 |
| 5,695,306 A | 12/1997 | Nygren, Jr. | 2002/0017182 A1 | 2/2002 | Gass et al. |
| 5,724,875 A | 3/1998 | Meredith et al. | 2002/0017183 A1 | 2/2002 | Gass et al. |
| 5,730,165 A | 3/1998 | Philipp | 2002/0017184 A1 | 2/2002 | Gass et al. |
| 5,755,148 A | 5/1998 | Stumpf et al. | 2002/0017336 A1 | 2/2002 | Gass et al. |
| 5,771,742 A | 6/1998 | Bokaie et al. | 2002/0020261 A1 | 2/2002 | Gass et al. |
| 5,782,001 A | 7/1998 | Gray | 2002/0020262 A1 | 2/2002 | Gass et al. |
| 5,787,779 A | 8/1998 | Garuglieri | 2002/0020263 A1 | 2/2002 | Gass et al. |
| 5,791,057 A | 8/1998 | Nakamura et al. | 2002/0020265 A1 | 2/2002 | Gass et al. |
| 5,791,223 A | 8/1998 | Lanzer | 2002/0020271 A1 | 2/2002 | Gass et al. |
| 5,791,224 A * | 8/1998 | Suzuki et al. ............ 83/488 | 2002/0056348 A1 * | 5/2002 | Gass et al. ............ 83/62.1 |
| 5,861,809 A | 1/1999 | Eckstein et al. | 2002/0056349 A1 * | 5/2002 | Gass et al. ............ 83/62.1 |
| 5,921,367 A | 7/1999 | Kashioka et al. | 2002/0056350 A1 | 5/2002 | Gass et al. |
| 5,937,720 A | 8/1999 | Itzov | 2002/0059853 A1 * | 5/2002 | Gass et al. ............ 83/62 |
| 5,942,975 A | 8/1999 | Sorensen | 2002/0059855 A1 * | 5/2002 | Gass et al. ............ 83/62 |
| 5,943,932 A | 8/1999 | Sberveglieri | 2002/0066346 A1 * | 6/2002 | Gass et al. ............ 83/58 |
| 5,950,514 A | 9/1999 | Benedict et al. | 2002/0069734 A1 | 6/2002 | Gass et al. |
| 5,963,173 A | 10/1999 | Lian et al. | 2002/0109036 A1 | 8/2002 | Denen et al. |
| 6,018,284 A | 1/2000 | Rival et al. | 2002/0170399 A1 * | 11/2002 | Gass et al. ............ 83/62.1 |
| 6,037,729 A | 3/2000 | Woods et al. | 2003/0005588 A1 | 1/2003 | Gass et al. |
| 6,095,092 A | 8/2000 | Chou | 2003/0019341 A1 | 1/2003 | Gass et al. |
| 6,119,984 A | 9/2000 | Devine | 2003/0020336 A1 | 1/2003 | Gass et al. |
| 6,133,818 A | 10/2000 | Hsieh et al. | 2003/0037651 A1 | 2/2003 | Gass et al. |
| 6,148,504 A | 11/2000 | Schmidt et al. | 2003/0056853 A1 * | 3/2003 | Gass et al. ............ 144/154.5 |
| 6,244,149 B1 | 6/2001 | Ceroll et al. | 2003/0074873 A1 | 4/2003 | Freiberg et al. |
| 6,257,061 B1 | 7/2001 | Nonoyama et al. | 2003/0089212 A1 | 5/2003 | Parks et al. |
| 6,366,099 B1 | 4/2002 | Reddi | 2003/0109798 A1 | 6/2003 | Kermani |
| 6,418,829 B1 | 7/2002 | Pilchowski | | | |
| 6,450,077 B1 | 9/2002 | Ceroll et al. | FOREIGN PATENT DOCUMENTS | | |
| 6,453,786 B1 | 9/2002 | Ceroll et al. | DE | 3427733 | 1/1986 |
| 6,460,442 B2 | 10/2002 | Talesky et al. | DE | 4235161 A1 | 5/1993 |
| 6,479,958 B1 | 11/2002 | Thompson et al. | EP | 146460 | 11/1988 |
| D466,913 S | 12/2002 | Ceroll et al. | EP | 0362937 A2 | 4/1990 |
| D469,354 S | 1/2003 | Curtsinger | ES | 2152184 | 1/2001 |
| 6,536,536 B1 | 3/2003 | Gass et al. | FR | 2556643 | 6/1985 |
| 6,543,324 B2 | 4/2003 | Dils | FR | 2570017 | 3/1986 |
| 6,546,835 B2 | 4/2003 | Wang | GB | 598204 | 2/1948 |
| 6,575,067 B2 | 6/2003 | Parks et al. | GB | 2096844 | 10/1982 |
| 6,578,856 B2 | 6/2003 | Kahle | GB | 2142571 | 1/1985 |
| 6,595,096 B2 | 7/2003 | Ceroll et al. | WO | WO 01/26064 A2 | 4/2001 |
| D478,917 S | 8/2003 | Ceroll et al. | | | |
| 6,601,493 B1 | 8/2003 | Crofutt | * cited by examiner | | |

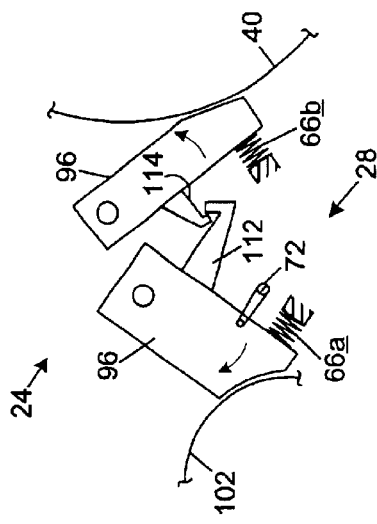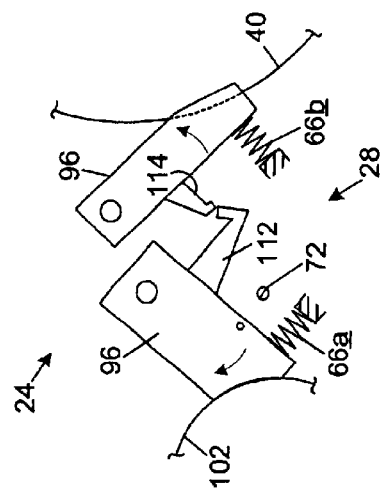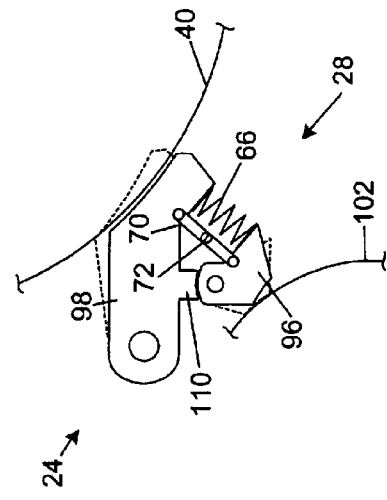

MITER SAW WITH IMPROVED SAFETY SYSTEM

CROSS-REFERENCE TO RELATED APPLICATIONS

This application is a continuation-in-part of the following U.S. Patent Applications, all of which are hereby incorporated by reference: Ser. No. 09/676,190, filed Sep. 29, 2000, Ser. No. 09/929,221, filed Aug. 13, 2001, Ser. No. 09/929,226, filed Aug. 13, 2001, Ser. No. 09/929,227, filed Aug. 13, 2001, Ser. No. 09/929,234, filed Aug. 13, 2001, Ser. No. 09/929,235, filed Aug. 13, 2001, Ser. No. 09/929,236, filed Aug. 13, 2001, Ser. No. 09/929,237, filed Aug. 13, 2001, Ser. No. 09/929,238, filed Aug. 13, 2001, Ser. No. 09/929,240, filed Aug. 13, 2001, Ser. No. 09/929,241, filed Aug. 13, 2001, Ser. No. 09/929,242, filed Aug. 13, 2001, Ser. No. 09/929,244, filed Aug. 13, 2001, Ser. No. 09/929,425, filed Aug. 13, 2001, and Ser. No. 09/929,426, filed Aug. 13, 2001 all of which are currently pending.

This application claims the benefit of and priority from the following U.S. Provisional Patent Applications, all of which are hereby incorporated by reference: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001 and Ser. No. 60/273,178, filed Mar. 2, 2001.

FIELD OF THE INVENTION

The present invention relates to miter saws, and more particularly to a miter saw with a high-speed safety system.

BACKGROUND AND SUMMARY OF THE INVENTION

Miter saws are a type of woodworking machinery used to cut workpieces of wood, plastic and other materials. Miter saws typically include a base upon which workpieces are placed and include a circular saw blade mounted on a pivot arm. A person uses a miter saw by placing a workpiece on the base beneath the upraised blade and then bringing the blade down via the pivot arm to cut the workpiece. Miter saws present a risk of injury to users because the spinning blade is often exposed when in use. Furthermore, users often use their hands to position and support workpieces beneath the blade, which increases the chance that an injury will occur.

The present invention provides a miter saw with an improved safety system that is adapted to detect the occurrence of one or more dangerous, or triggering, conditions during use of the miter saw, such as when a user's body contacts the spinning saw blade. When such a condition occurs, the safety system is actuated to limit or even prevent injury to the user.

BRIEF DESCRIPTION OF THE DRAWINGS

FIG. 5 is a fragmentary schematic view of an alternative safety system configured to stop both the rotation and translation of the blade.

FIG. 6 is a fragmentary schematic view of an alternative safety system configured to stop both the rotation and translation of the blade.

FIG. 7 is similar to FIG. 6 but shows the brake mechanism in the actuated state.

DETAILED DESCRIPTION AND BEST MODE OF THE INVENTION

Figure 1:
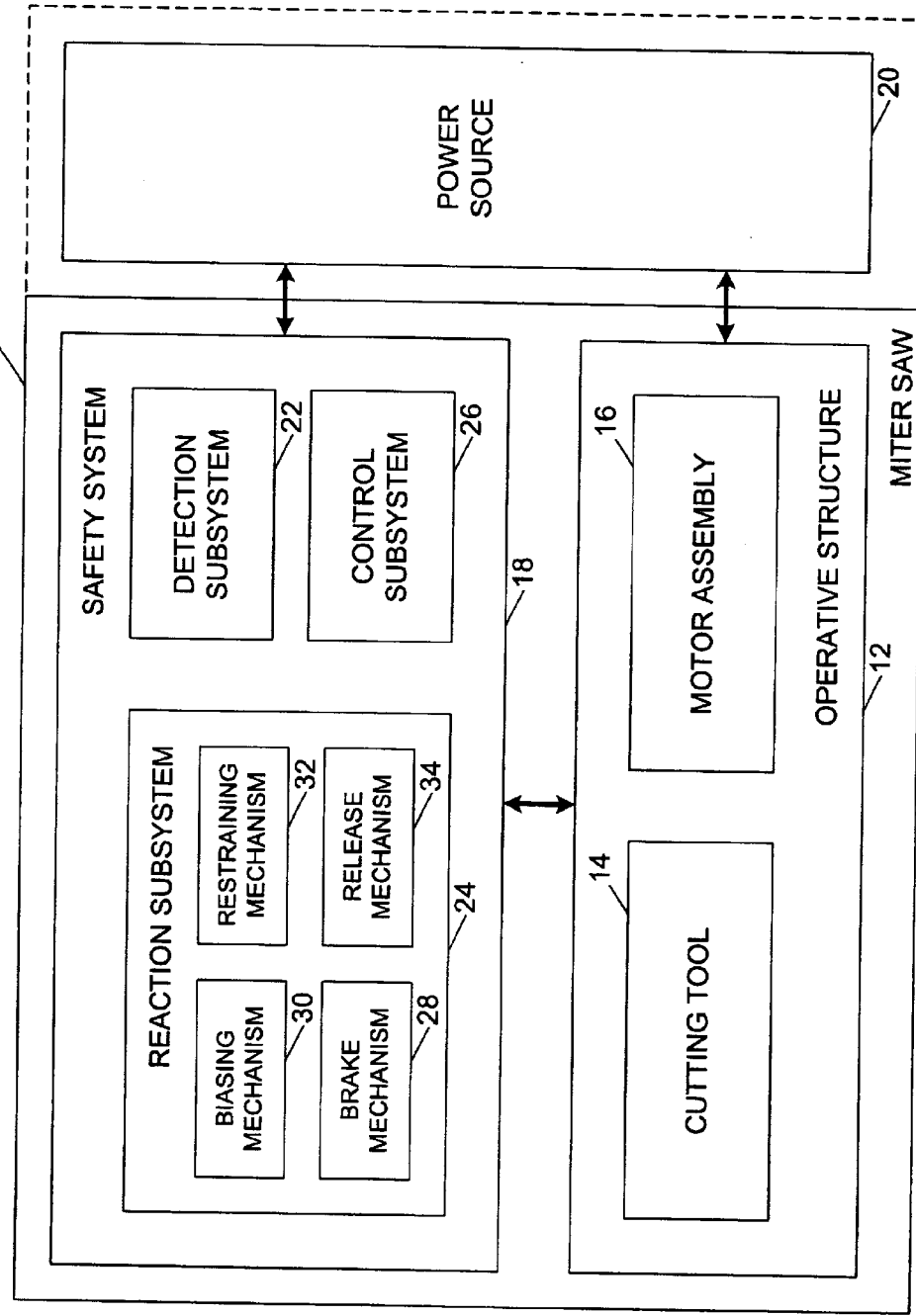
FIG. 1 is a schematic block diagram of a miter saw with a fast-acting safety system according to the present invention.

A miter saw according to the present invention is shown schematically in FIG. 1 and indicated generally at 10. Miter saw 10 may be any of a variety of different types and configurations of miter saw adapted for cutting workpieces, such as wood, plastic, etc. Miter saw 10 includes an operative structure 12 having a cutting tool 14 and a motor assembly 16 adapted to drive the cutting tool. Miter saw 10 also includes a safety system 18 configured to minimize the potential of a serious injury to a person using miter saw 10. Safety system 18 is adapted to detect the occurrence of one or more dangerous, or triggering, conditions during use of miter saw 10. If such a dangerous condition is detected, safety system 18 is adapted to engage operative structure 12 to limit any injury to the user caused by the dangerous condition.

Miter saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of miter saw 10.

It will be appreciated that operative structure 12 may take any one of many different forms, depending on the type of miter saw 10. As will be described in more detail below, operative structure 12 typically takes the form of an arm pivotally coupled to a base. Cutting tool 14 is mounted on the arm and pivotal toward a workpiece supported by the base. Alternatively, the arm may be both pivotally and slidably coupled to the base.

Motor assembly 16 includes one or more motors adapted to drive cutting tool 14. The motors may be either directly or indirectly coupled to the cutting tool. Typically, motor assembly 16 is mounted on the pivot arm and directly coupled to the cutting tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of miter saw 10. In addition, control subsystem 26 typically includes one or more instruments operable by a user to control the miter saw. The control subsystem is configured to control miter saw 10 in response to the inputs it receives.

Detection subsystem 22 is configured to detect one or more dangerous, or triggering, conditions during use of miter saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of miter saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of miter saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
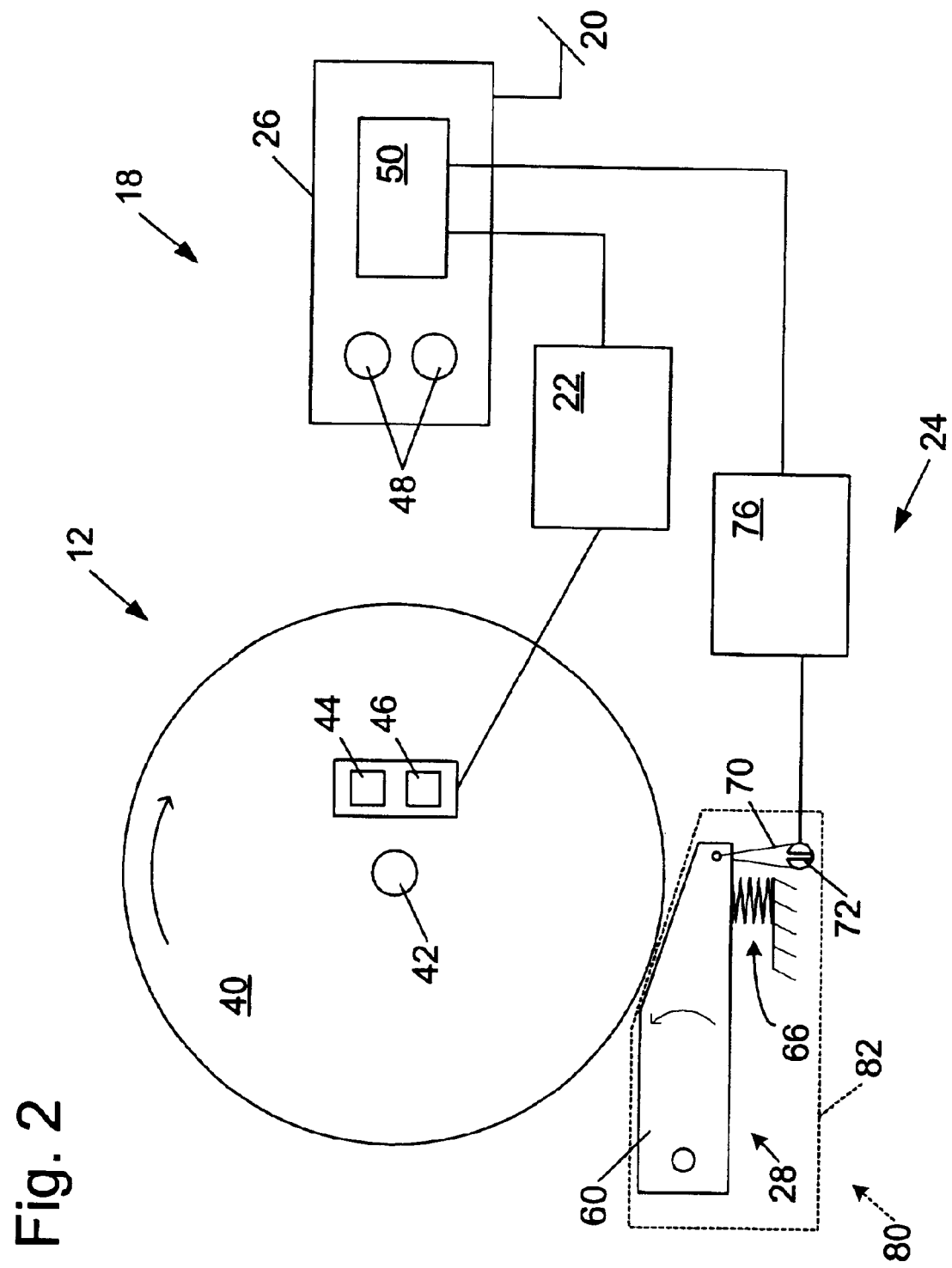
FIG. 2 is a schematic diagram of an exemplary safety system configured to stop the miter saw blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of miter saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of miter saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000 and U.S. patent application Ser. No. 09/929,221, filed Aug. 13, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control to inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately ⅟₃₂-inch to ¼-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000 and U.S. patent application Ser. No. 09/929,241, filed Aug. 13, 2001, the disclosures of which are herein incorporated by reference.

It will be appreciated that activation of the brake mechanism will typically require the replacement of one or more portions of safety system 18. For example, pawl 60 and fusible member 70 typically must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000, U.S. patent application Ser. No. 09/929,244, filed Aug. 13, 2001, the disclosures of which are herein incorporated by reference.

In the exemplary embodiment illustrated in FIG. 2, reaction subsystem 24 is configured to act on cutting tool 14 and stop the rotation of blade 40. As mentioned above, reaction subsystem 24 may also be configured to act on a different portion of operative structure 12 to stop the translation of blade 40 toward the workpiece and the user's body. Otherwise, the blade may continue to move toward the user's body even though the blade has stopped rotating.

Figure 3:
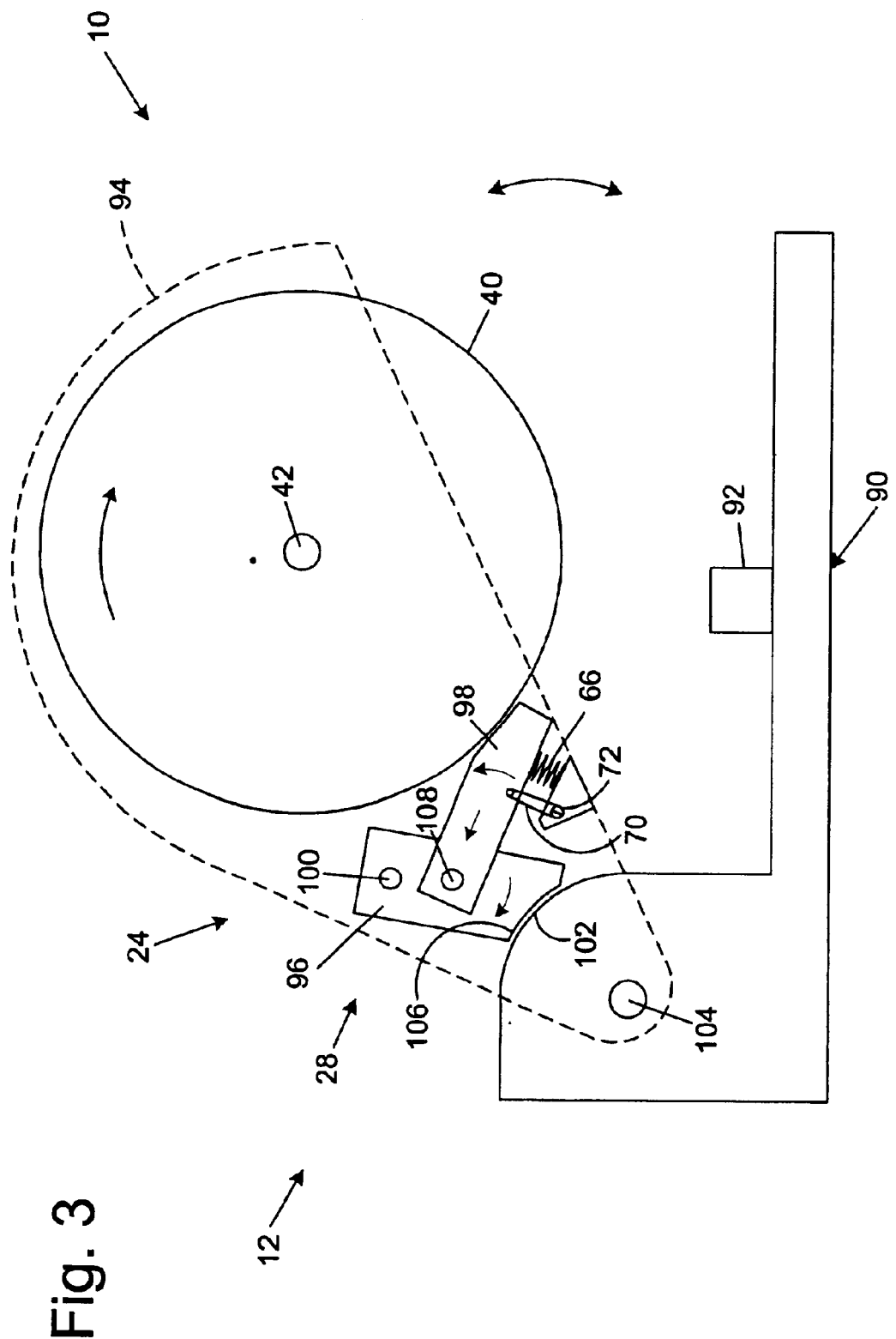
FIG. 3 is a schematic side view of a miter saw having an exemplary safety system configured to stop both the rotation and translation of the blade.
Figure 4:
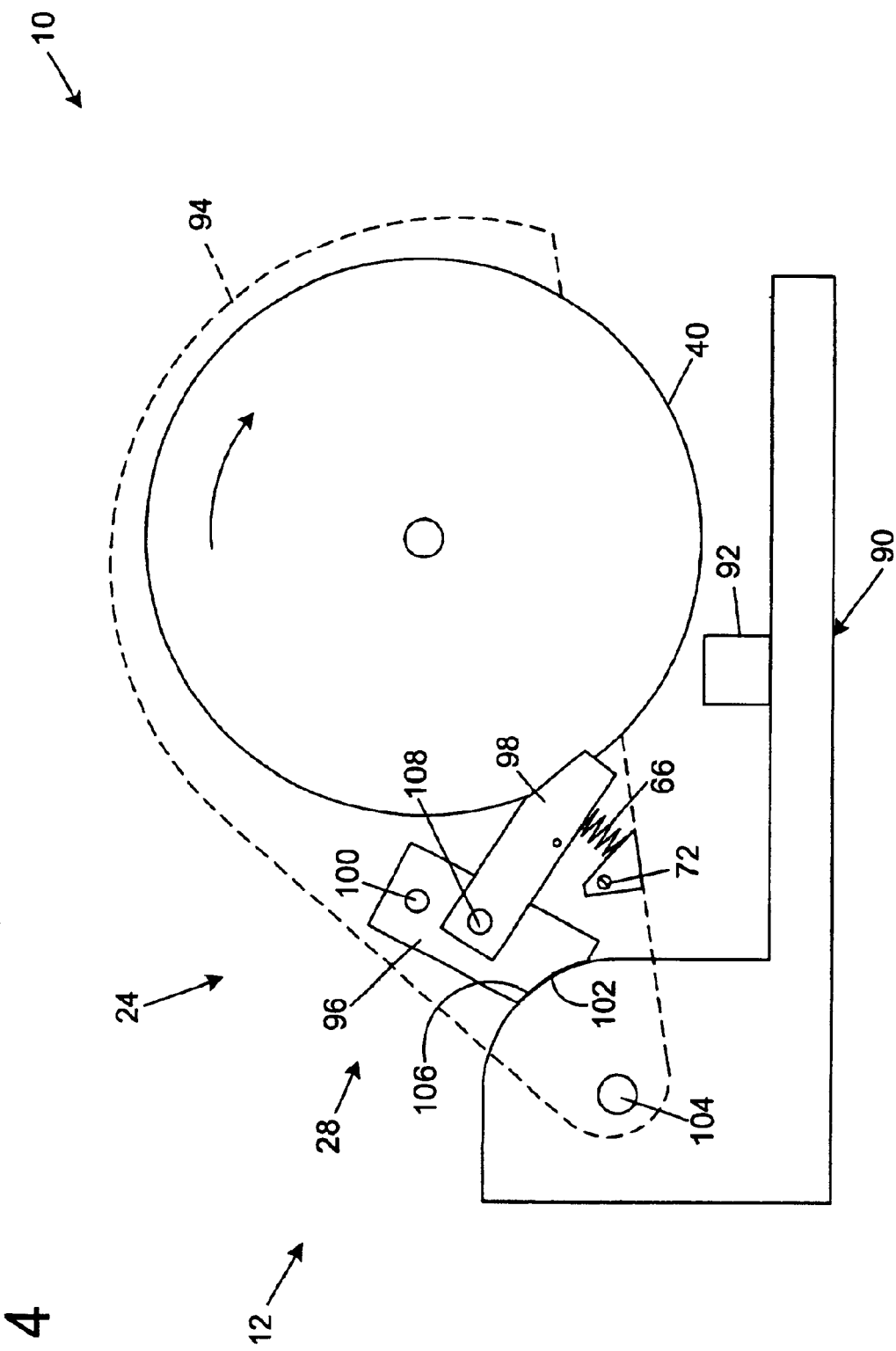
FIG. 4 is similar to FIG. 3 but shows the brake mechanism in the actuated state.

For example, FIGS. 3 and 4 provide a schematic illustration of a different exemplary embodiment of miter saw 10 in which reaction subsystem 24 is configured to stop the downward pivoting movement of operative structure 12. Exemplary miter saw 10 includes a base assembly 90 adapted to support a workpiece during cutting. Typically, one or more fences 92 are mounted on base assembly 90 and adapted to prevent workpieces from shifting across the base assembly during cutting. The miter saw also includes a blade 40 mounted on an arbor 42. The arbor is driven by a motor assembly (not shown) which is supported above base assembly 90 by a pivot arm 94. As shown in FIGS. 3 and 4, the pivot arm is pivotal toward and away from the base assembly to cut workpieces with the blade. In addition, some portion of the base assembly may be adjustable to tilt the blade relative to the workpiece to perform beveled cuts.

Upon receipt of an activation signal from control subsystem 26, reaction subsystem 24 is configured to engage and stop the rotation of blade 40. In addition, the reaction subsystem is configured to stop the movement of pivot arm 94 toward the base assembly. This ensures that the blade does not continue to move downward toward the workpiece and the user's body after the blade has stopped rotating.

It will be appreciated that reaction subsystem 24 may be configured to stop the movement of the pivot arm toward the base assembly in many different ways within the scope of the invention. In the embodiment depicted in FIGS. 3 and 4, the exemplary reaction subsystem includes a brake mechanism 28 configured to engage both blade 40 and a portion of base assembly 90. Brake mechanism 28 includes a first brake pawl 96 configured to engage a portion of the base assembly to stop the downward movement of the blade. The brake mechanism also includes a second brake pawl 98 configured to engage the blade and stop its rotation.

First brake pawl 96 is connected to pivot arm 94 by a coupling 100, and pivotal into binding engagement with a gripping surface 102 of the base assembly. When the first brake pawl binds against gripping surface 102, further downward movement of the pivot arm toward the base assembly is prevented. Conversely, the engagement between the first brake pawl and the gripping surface does not prevent the pivot arm and blade from being moved upward away from the base assembly.

First brake pawl 96 and gripping surface 102 are shaped to ensure that the first brake pawl will engage and bind against the gripping surface regardless of the position of the pivot arm. In the exemplary embodiment, gripping surface 102 defines an arc having a radial center, indicated at 104, that is concentric with the pivot axis of pivot arm 94. Exemplary first brake pawl 96 includes an engagement surface 106 shaped to conform generally to the gripping surface. Optionally, gripping surface 102 and/or engagement surface 106 may include structure (e.g., serrations, etc.) to enhance the gripping engagement between the first brake pawl and the base assembly. Additionally or alternatively, the gripping surface and/or the engagement surface may be formed of, or covered with, a high-friction material (e.g., rubber, etc.) to enhance the gripping engagement between the first brake pawl and the base assembly.

Second brake pawl 98 is connected to first brake pawl 96 by a coupling 108, between pivot coupling 100 of the first brake pawl and gripping surface 102. The second brake pawl is positioned proximate the rear of blade 40, and is pivotal into the teeth of the blade to stop its rotation. When the second brake pawl engages the blade, the rotation of the blade pushes the second brake pawl backward and upward. Since the second brake pawl is coupled to the first brake pawl, the first brake pawl is pivoted into engagement with gripping surface 102. The substantial amount of force supplied by the spinning blade is transferred to the first brake pawl, causing it to bind against the gripping surface with proportionally corresponding force. In other words, exemplary brake mechanism 28 is configured to convert at least a portion of the rotational energy of the blade into braking force between the pivot arm and base assembly. As a result, no additional source of energy is needed to stop the translation of the blade. Additionally, downward force on the pivot arm tends to pivot the first brake pawl more tightly against the gripping surface. Thus, if the pivot arm is being pulled downward at the time contact is detected, the momentum of the pivot arm as well as the force applied by a user is at least partially converted into braking force between the pivot arm and base assembly.

Brake mechanism 28 is held in an unactuated or untriggered configuration (shown in FIG. 3) by a restraining mechanism such as a fusible member 70 coupled to second brake pawl 98. When the brake mechanism is in the untriggered configuration, the first and second brake pawls are positioned slightly spaced apart from the gripping surface and the blade, respectively. The reaction subsystem also includes a firing subsystem having a contact mount 72 adapted to melt fusible member 70. Once the brake mechanism has been released, a biasing mechanism such as compression spring 66 urges second brake pawl 98 into the teeth of blade 40, thereby driving the second brake pawl backward and upward to engage the first brake pawl with the gripping surface. Exemplary biasing mechanisms, restraining mechanisms and release mechanisms are described in more detail in the incorporated references. Alternatively, brake mechanism 28 may be configured to engage the blade and base assembly by any other suitable means.

It will be appreciated that the first and second brake pawls may be configured in a variety of other ways to stop the rotation and downward movement of the blade. As one example, FIG. 5 shows an alternative configuration of the brake mechanism in which second brake pawl 98 is pivotally coupled to the pivot arm rather than to first brake pawl 96. Spring 66 is disposed between the first and second brake pawls while fusible member 70 holds the pawls together in an unactuated configuration. A portion 110 of the second brake pawl is configured to butt against the first brake pawl so that the first and second brake pawls are self-positioning (i.e., slightly spaced apart from the gripping surface and blade, respectively) when held in the unactuated configuration by fusible member 70. The fusible member passes over a contact mount 72 adapted to melt the fusible member. When the brake pawls are released, spring 66 urges the first brake pawl into binding engagement with the gripping surface, and urges the second brake pawl into the teeth of the blade. Thus, spring 66 functions as a biasing mechanism for both brake pawls.

Another alternative configuration of brake mechanism 28 is shown in FIGS. 6 and 7. In this embodiment, fusible member 70 is arranged to hold first brake pawl 96 in an unactuated position spaced apart from gripping surface 102 against the urging of a first spring 66a. The first brake pawl includes a grappling structure 112 adapted to grip an anchor structure 114 on second brake pawl 98. As shown in FIG. 6, grappling structure 112 holds the second brake pawl in an unactuated position so long as the first brake pawl is restrained by fusible member 70. Once the first brake pawl is released, grappling structure 112 disengages from anchor structure 114, thereby releasing the second brake pawl to pivot into the teeth of blade 40 under the urging of a second spring 66b as shown in FIG. 7. Thus, first brake pawl 96 serves as the release mechanism for the second brake pawl. While one particular configuration and arrangement of grappling structure 112 and anchor structure 114 are shown, it will be appreciated any configuration and arrangement adapted to hold the second brake pawl in the unactuated position may be used.

As described above, the present invention provides a miter saw which is substantially safer than existing saws. The miter saw includes a safety system 18 adapted to detect the occurrence of a dangerous condition and stop the movement of the blade and the pivot arm to prevent serious injury to a user. Those of skill in the art will appreciate that many modifications and variations to the exemplary embodiments are possible within the scope of the invention. Additionally, any of a variety of other embodiments of safety system 18 may be used such as are described in the references incorporated above, as well as in U.S. Provisional Patent Application Ser. No. 60/270,941, filed Feb. 22, 2001 and U.S. Provisional Patent Application Ser. No. 60/270,942, filed Feb. 22, 2001, the disclosures of which are herein incorporated by reference. Furthermore, the safety system may be adapted for use on a variety of other saws in addition to miter saws. Several examples of such modifications and variations, as well as such other saws are described in more detail in the following references, the disclosures of which are herein incorporated by reference: PCT Patent Application Ser. No. PCT/US00/26812, filed Sep. 29, 2000; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and nonobvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A woodworking machine comprising:
   a base assembly defining a cutting zone;
   operative structure movably coupled to the base assembly;
   a movable cutting tool mounted on the operative structure and configured to cut workpieces in the cutting zone when the operative structure is moved toward the cutting zone;

a motor configured to move the cutting tool;

a detection system configured to detect one or more dangerous conditions between a person and the cutting tool; and a reaction system configured to stop the movements of the cutting tool and the operative structure in response to the detection of a dangerous condition by the detection system, where the reaction system is coupled to the operative structure and configured to selectively engage both the cutting tool and the base assembly; where the reaction system includes a first braking element configured to engage the cutting tool, and a second braking element configured to engage the base assembly; and where the first and second braking elements are pivotally coupled together.

2. The woodworking machine of claim 1, where the reaction system includes a biasing mechanism configured to urge the first braking element into engagement with the cutting tool.

3. The woodworking machine of claim 1, where the biasing mechanism is configured to urge the second braking element into engagement with the base assembly.

4. The woodworking machine of claim 1, where the first braking element is configured to urge the second braking element into engagement with the base assembly.

5. A woodworking machine comprising;

a base assembly defining a cutting zone;

operative structure movably coupled to the base assembly;

a movable cutting tool mounted on the operative structure and configured to cut workpieces in the cutting zone when the operative structure is moved toward the cutting zone;

a motor configured to move the cutting too;

a detection system configured to detect one or more dangerous conditions between a person and the cutting tool; and a reaction system configured to stop the movements of the cutting tool and the operative structure in response to the detection of a dangerous condition by the detection system, where the reaction system is coupled to the operative structure and configured to selectively engage both the cutting tool and the base assembly; where the reaction system includes a first braking element configured to engage the cutting tool, and a second braking element configured to engage the base assembly; and where the reaction system includes a biasing mechanism configured to urge the second braking element into engagement with the base assembly, and where the first braking element is configured to releasably restrain the second braking element against the urging of the biasing mechanism.

6. The woodworking machine of claim 5, where the second braking element includes anchor structure, and where the first braking element includes grappling structure configured to releasably grip the anchor structure.

7. A miter saw comprising:

a base assembly;

a pivot arm assembly movably coupled to the base assembly;

a rotatable blade mounted on the pivot arm assembly;

a motor configured to drive the blade;

a detection system configured to detect accidental contact between a person and the blade; and a reaction system coupled to the pivot arm assembly and configured to stop both the movement of the pivot arm assembly and the rotation of the blade upon the detection of contact by the detection system;

where the reaction system includes a first braking element configured to engage and stop the movement of the blade, and a second braking element configured to engage the base assembly and stop the movement of the pivot arm assembly, where the first braking element is configured to urge the second braking element into engagement with the base assembly.

8. The miter saw of claim 7, where the first and second braking elements are pivotally coupled together.

* * * * *